US012327913B2

(12) United States Patent
Lin

(10) Patent No.: US 12,327,913 B2
(45) Date of Patent: Jun. 10, 2025

(54) BROADBAND BIPOLAR MILLIMETER WAVE ANTENNA

(71) Applicant: Hitron Technologies Inc., Hsinchu (TW)

(72) Inventor: Liao Yen Lin, Toufen (TW)

( * ) Notice: Subject to any disclaimer, the term of this patent is extended or adjusted under 35 U.S.C. 154(b) by 215 days.

(21) Appl. No.: 18/060,580

(22) Filed: Dec. 1, 2022

(65) Prior Publication Data

US 2024/0186717 A1 Jun. 6, 2024

(51) Int. Cl.
*H01Q 9/04* (2006.01)
*H01Q 19/00* (2006.01)

(52) U.S. Cl.
CPC ........... *H01Q 19/005* (2013.01); *H01Q 9/045* (2013.01)

(58) Field of Classification Search
CPC ..... H01Q 19/005; H01Q 9/045; H01Q 9/0414
See application file for complete search history.

(56) References Cited

U.S. PATENT DOCUMENTS 11,967,764 B1 * 4/2024 Lim .................. H01Q 21/0006
11,978,964 B2 * 5/2024 Wang .................... H01Q 21/24

FOREIGN PATENT DOCUMENTS

CN 110854529 A * 2/2020 ............... H01Q 1/38
WO WO-2018087956 A1 * 5/2018 ............... H01Q 1/38

* cited by examiner

*Primary Examiner* — Graham P Smith
(74) *Attorney, Agent, or Firm* — OPES IP Consulting Co., Ltd.

(57) ABSTRACT

The invention provides a broadband bipolar mmWave antenna comprising: a first substrate having an upper surface and a bottom surface; a second substrate attached to the bottom surface of the first substrate; a parasitic element disposed in between the first and second substrates; a patch formed on the upper surface of the first substrate; a first feeding line coupled with the patch and formed on the upper surface of the first substrate; a second feeding line coupled with the patch and formed on the upper surface of the first substrate; and a via formed passing through the first substrate, the parasitic element and the second substrate.

7 Claims, 17 Drawing Sheets

BROADBAND BIPOLAR MILLIMETER WAVE ANTENNA

BACKGROUND OF THE INVENTION

For wireless communication, extremely high frequency (EHF) is the International Telecommunication Union (ITU) designation for the band of radio frequencies in the electromagnetic spectrum from 30 to 300 gigahertz (GHz). Radio waves in this band have wavelengths from ten to one millimetre, so it is also called the millimetre band and radiation in this band is called millimetre waves, sometimes abbreviated MMW or mmWave.

Communication systems through mmWave have attracted significant interest regarding meeting the capacity requirements of nowadays rapidly developing 5G network. The mmWave systems have frequency ranges in between 30 and 300 GHz where a total of around 250 GHz bandwidths are available. Although the available bandwidth of mmWave frequencies is promising, the propagation characteristics are significantly different from microwave frequency bands in terms of path loss, diffraction and blockage, rain attenuation, atmospheric absorption, and foliage loss behaviors.

With frequency ranges from 24.25 to 29.5 GHz, mmWave has been allocated for 5G networks in many different countries. For example, the U.S. has 5G network frequency ranges between 26.5 and 28.35 GHz and between 37 and 40 GHz; South Korea has frequency ranges between 26.5 and 29.5 GHz; China has frequency ranges between 24.25 and 27.5 GHz and between 37 and 43.5 GHz; Europe has frequency ranges between 24.25 and 27.5 GHz; and Japan has frequency ranges between 27.5 and 28.28 GHz.

Although mmWave-based communication can provide wide bandwidths, and thus a high data rate, the communication is limited by a high signal attenuation due to atmospheric absorption. Therefore, a high-gain phased array antenna with beamforming capability is needed. Also, antenna structure embedded within an integrated circuit (IC) package, namely antenna-in-package (AiP), instead of a discrete antenna is in high demand due to compactness, fabrication reliability, and cost-effectiveness. Hence, various mmWave phased array antennas using AiP design, which operate at 28 GHz frequency bands, have been widely investigated.

One of the conventional structures of the broadband bipolar mmWave antenna, as disclosed by Steffen Seewald and Dirk Manteuffel in the 2019 IEEE-APWC paper (Steffen Seewald and Dirk Manteuffel, *Design Approach for Modular Millimeter Wave Beamforming Antenna Arraysfor 5G Pico-Cells,* 2019 IEEE-APS Topical Conference on Antennas and Propagation in Wireless Communications), is taken for an example. The antenna structure as disclosed in the paper, is complicated, hereby increases the difficulty for manufacturing.

According to another conventional structure of the broadband bipolar mmWave antenna, as disclosed by Kyei Anim, Jung-Nam Lee and Young-Bae Jung in their Sensors 2021 article (Kyei Anim et al., *High-Gain Millmeter-Wave Patch Array Antenna for Unmanned Aerial Vehicle Application,* 21, 3914, Sensors 2021), the design of conventional patch antennas, uses multi-layer substrates for lamination as well as the use of slot technology and many vias. These conventional structures increase the difficulty of production and therefore drive up the manufacturing cost.

SUMMARY OF THE INVENTION

One of the aspects of the present invention is to provide a broadband bipolar mmWave antenna with low manufacturing cost and simple manufacturing process.

Accordingly, the present invention provides a broadband bipolar mmWave antenna, comprising: a first substrate having an upper surface and a bottom surface; a second substrate attached to the bottom surface of the first substrate; a parasitic element disposed in between the first and second substrates; a patch formed on the upper surface of the first substrate; a first feeding line coupled with the patch and formed on the upper surface of the first substrate; a second feeding line coupled with the patch and formed on the upper surface of the first substrate; and a via formed passing through the first substrate, the parasitic element and the second substrate.

Preferably, the antenna further includes a ground substrate attached to the second substrate.

Preferably, the antenna operates at a frequency band ranges from 25.6 GHz to 29.8 GHz.

Preferably, the first substrate is a Rogers RO3003™ high frequency substrate.

Preferably, the second substrate is a FR-4 substrate.

Preferably, the ground substrate is a FR-4 substrate.

Preferably, the size of the antenna is 10.19 mm×10.19 mm.

Preferably, the first substrate has a thickness of 1 mm.

Preferably, the second substrate has a thickness of 0.5 mm.

DETAILED DESCRIPTION OF THE INVENTION

This invention relates to a broadband bipolar millimeter wave (mmWave) antenna and, more particularly, to a broadband bipolar mmWave antenna with low manufacturing cost and simple manufacturing process.

Unless defined otherwise, all technical and scientific terms used herein have the same meanings as commonly understood by one of skill in the art to which this disclosure belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
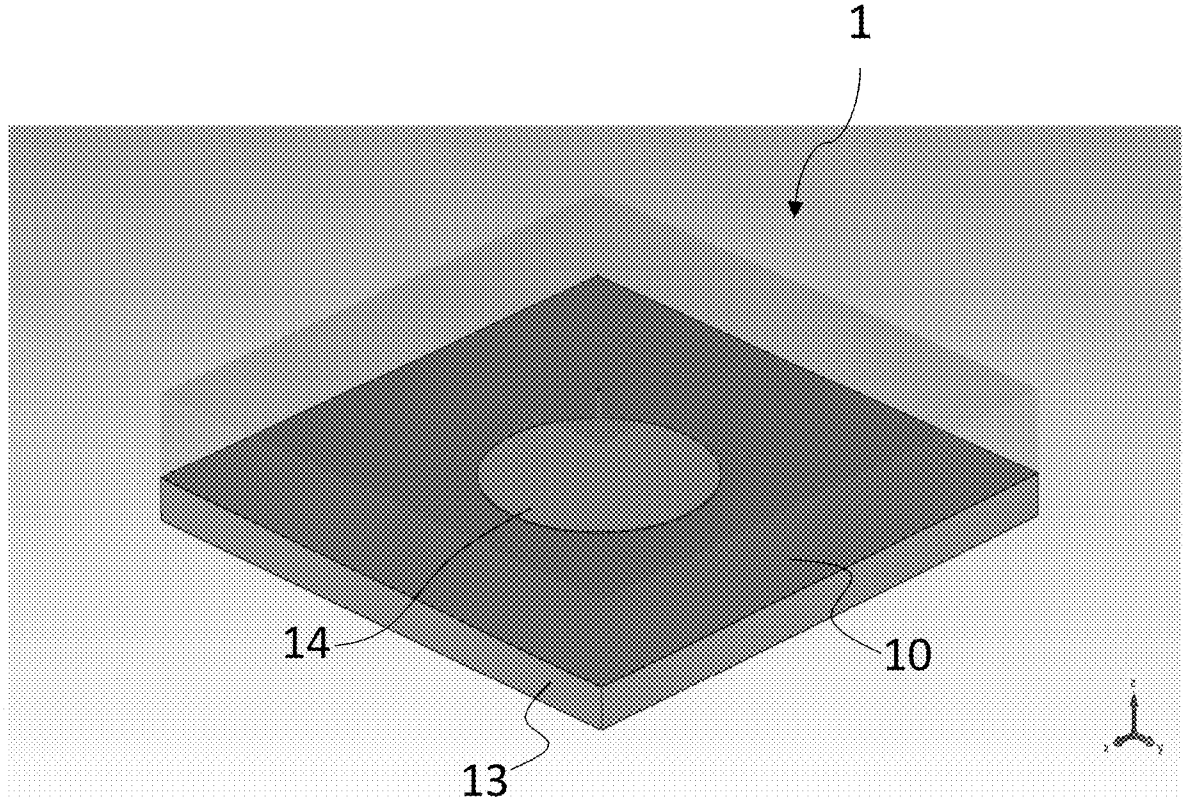
FIGS. 1A-1B illustrates a first embodiment of the broadband bipolar mmWave antenna of the present invention.
Figure 1B:
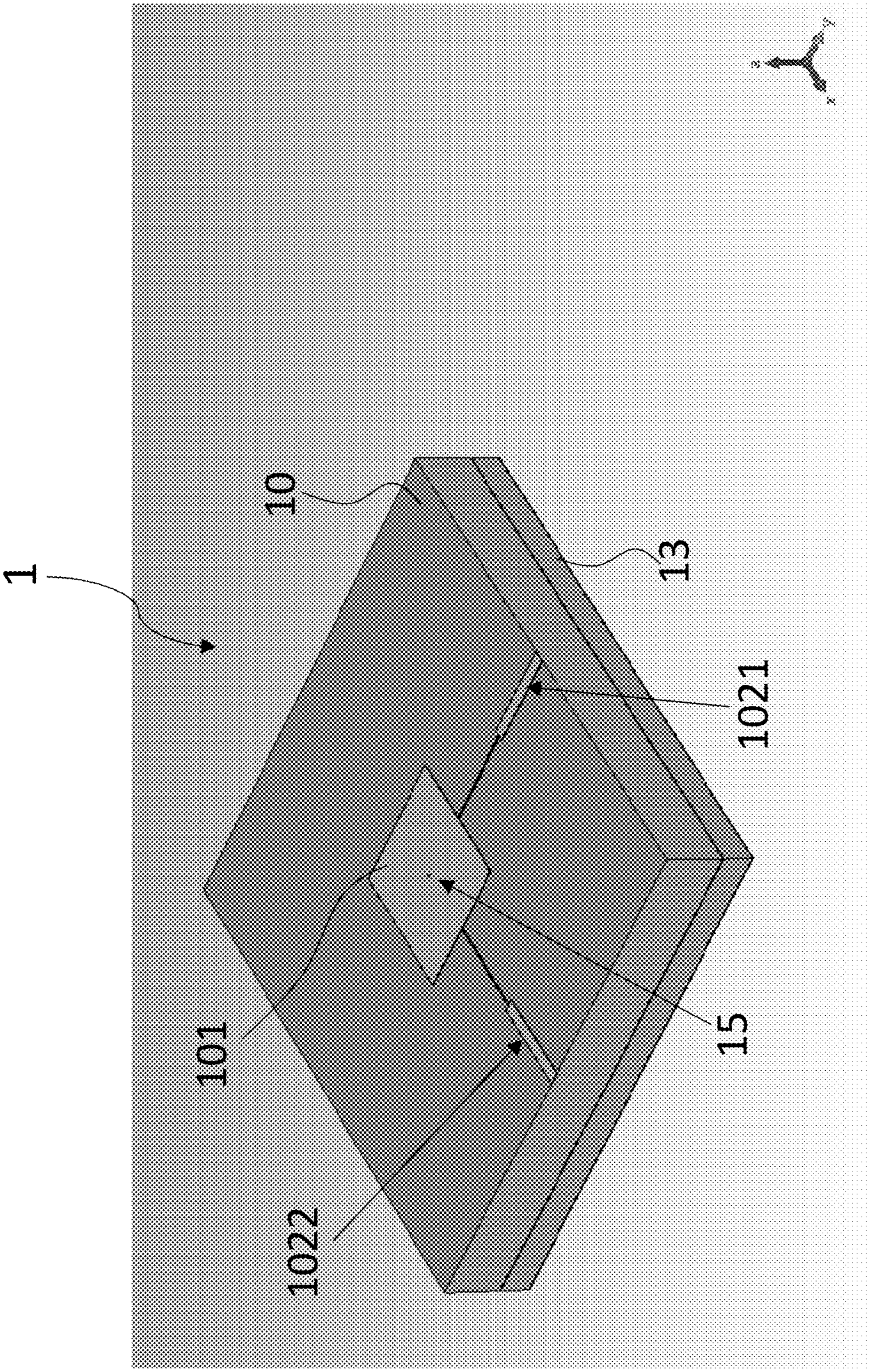
Figure 2:
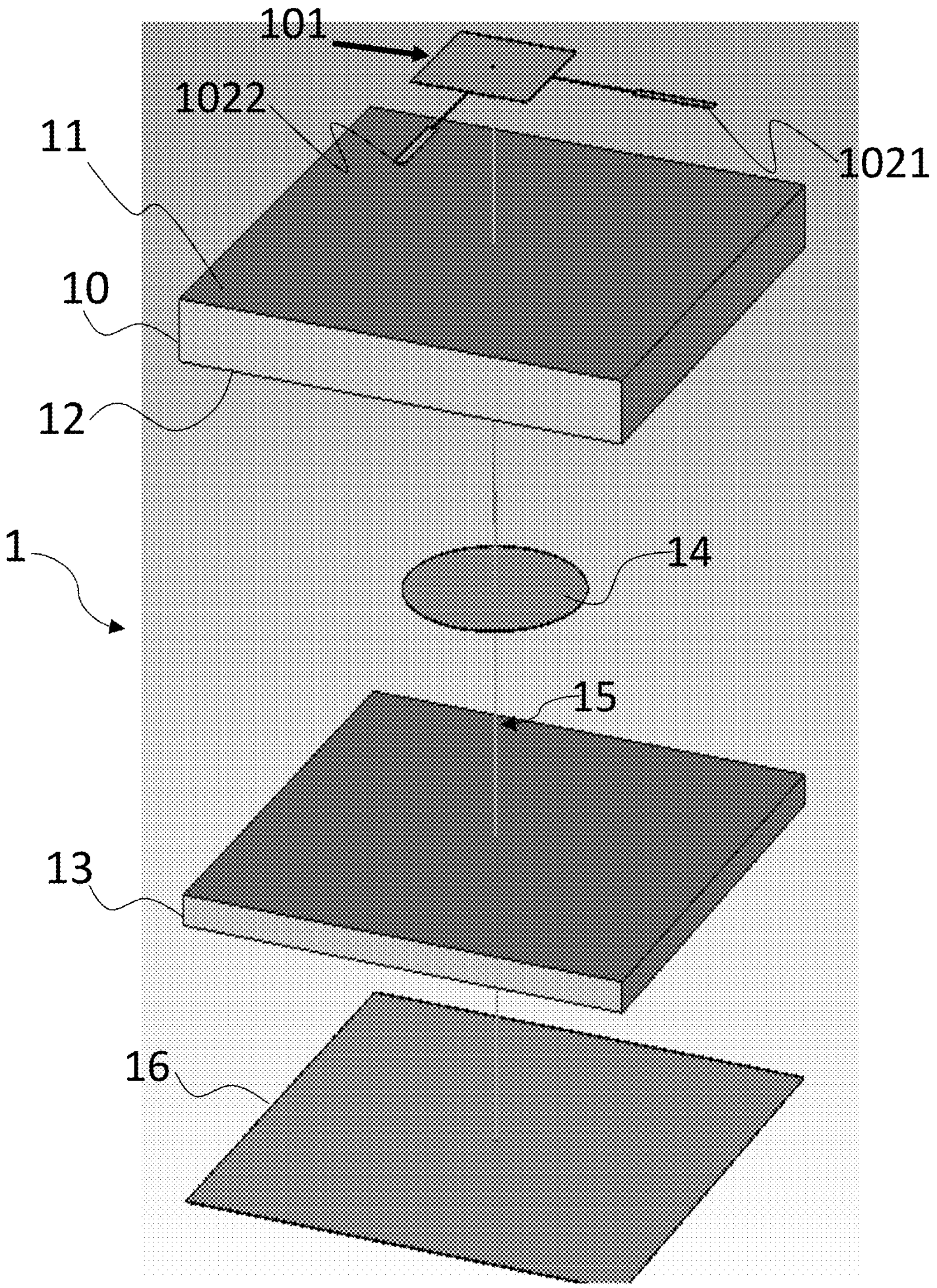
FIG. 2 illustrates a second embodiment of the broadband bipolar mmWave antenna of the present invention.

Reference is collectively made to FIGS. 1A-1B and FIG. 2, where FIGS. 1A-1B illustrates a first embodiment of the broadband bipolar mmWave antenna of the present invention, and FIG. 2 illustrates a second embodiment of the broadband bipolar mmWave antenna of the present invention.

As shown in these figures, the broadband bipolar mmWave antenna 1 includes a first substrate 10 having an upper surface 11 and a bottom surface 12, a second substrate 13 attached to the bottom surface 12 of the first substrate 10, a parasitic element 14 disposed in between the first and second substrates 10, 13, a patch 101 formed on the upper surface 11 of the first substrate 10, a first feeding line 1021 (port 1) coupled with the patch 101 and formed on the upper surface 11 of the first substrate 10, a second feeding line 1022 (port 2) coupled with the patch 101 and formed on the upper surface 11 of the first substrate 10, and a via 15 formed passing through the first substrate 10, the parasitic element and the second substrate 13.

For the second embodiment as shown in FIG. 2, the broadband bipolar mmWave antenna 1 further includes a ground substrate (GND) 16 attached to the second substrate 13. The via 15 also passes through the ground substrate (GND) 16, as can be seen in FIG. 2.

One difference between the first embodiment and the second embodiment is that the second embodiment antenna further includes a ground substrate, while the first embodiment antenna does not comprise such ground substrate. The ground substrate is an optional element, so that such optional element should not be limiting the scope of the present invention.

Figure 3:
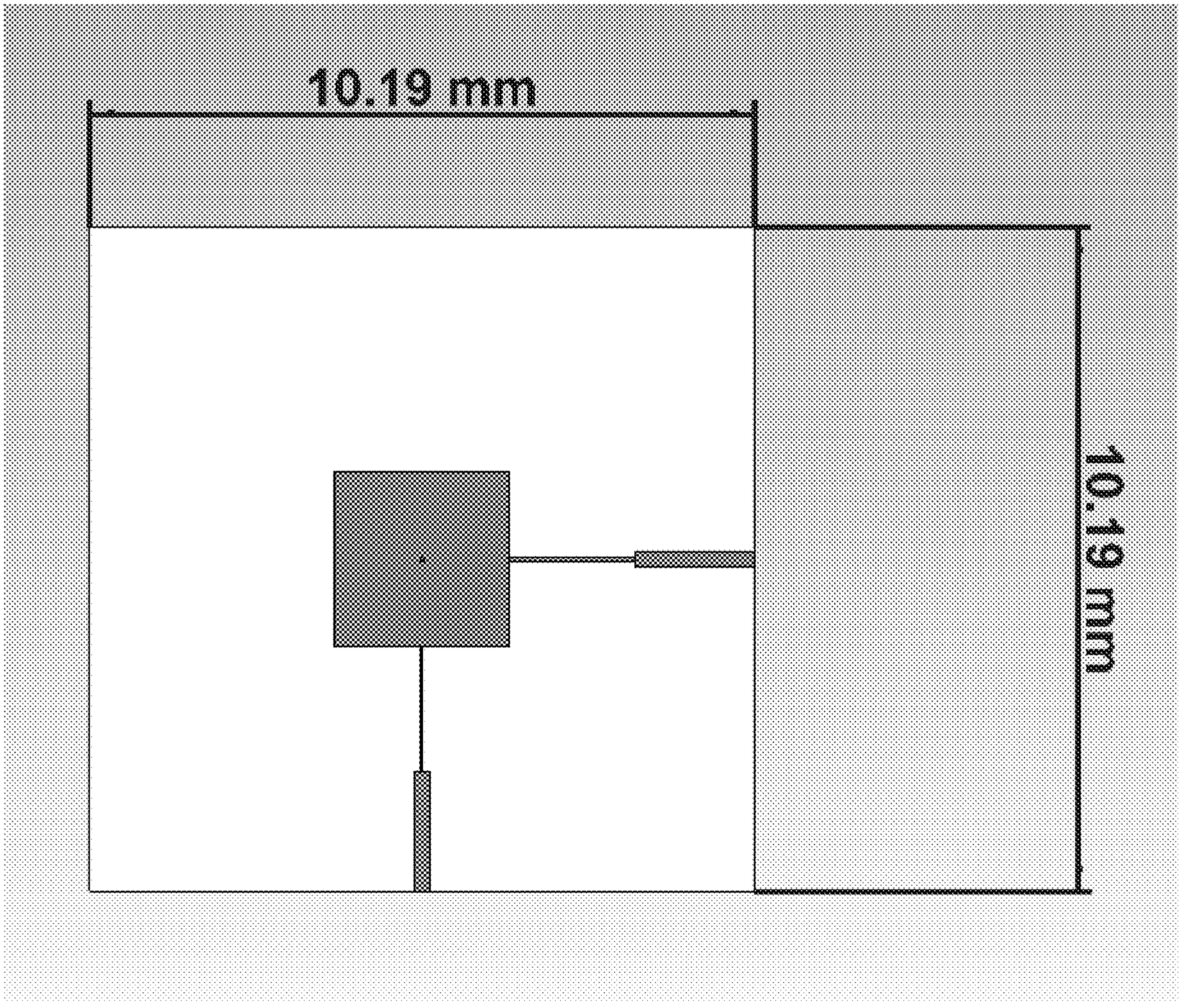
FIG. 3 illustrates a preferable size to the broadband bipolar mmWave antenna of the present invention.
Figure 4:
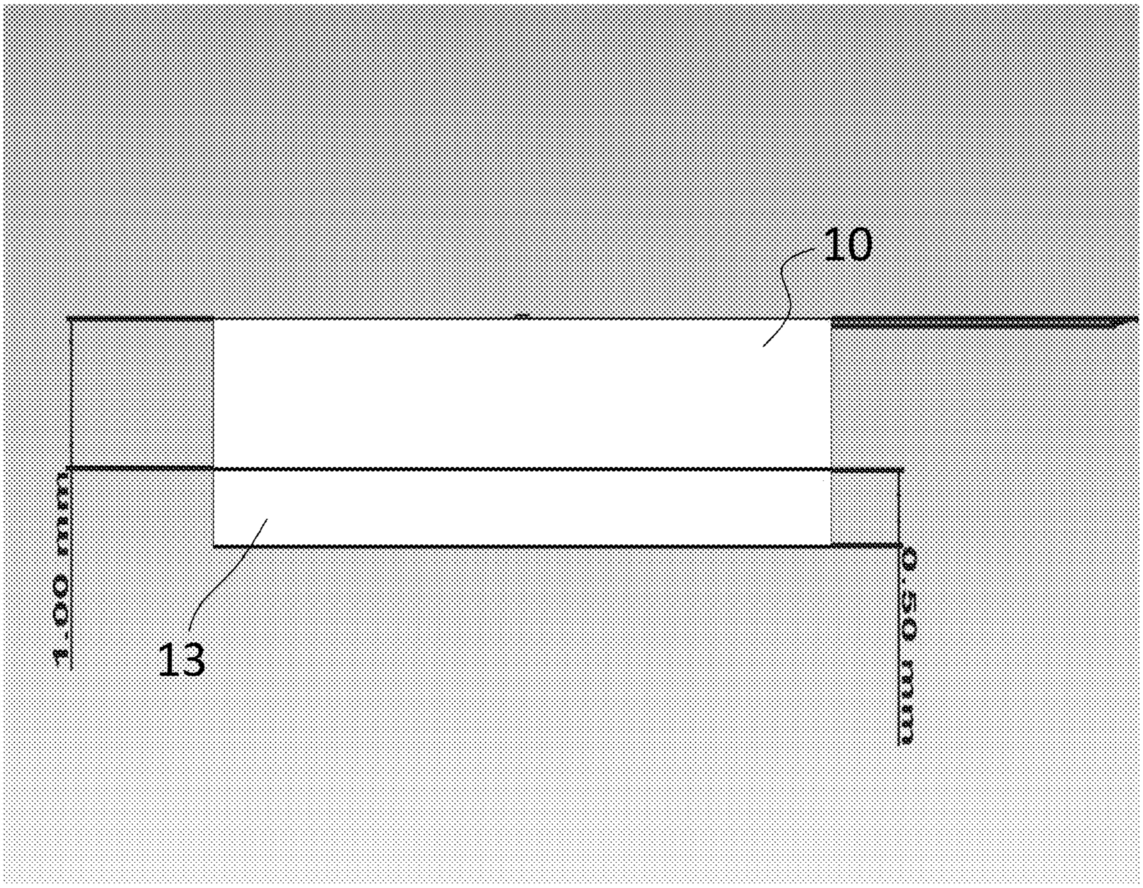
FIG. 4 illustrates the preferable size to the broadband bipolar mmWave antenna of the present invention from a different angle.
Figure 5:
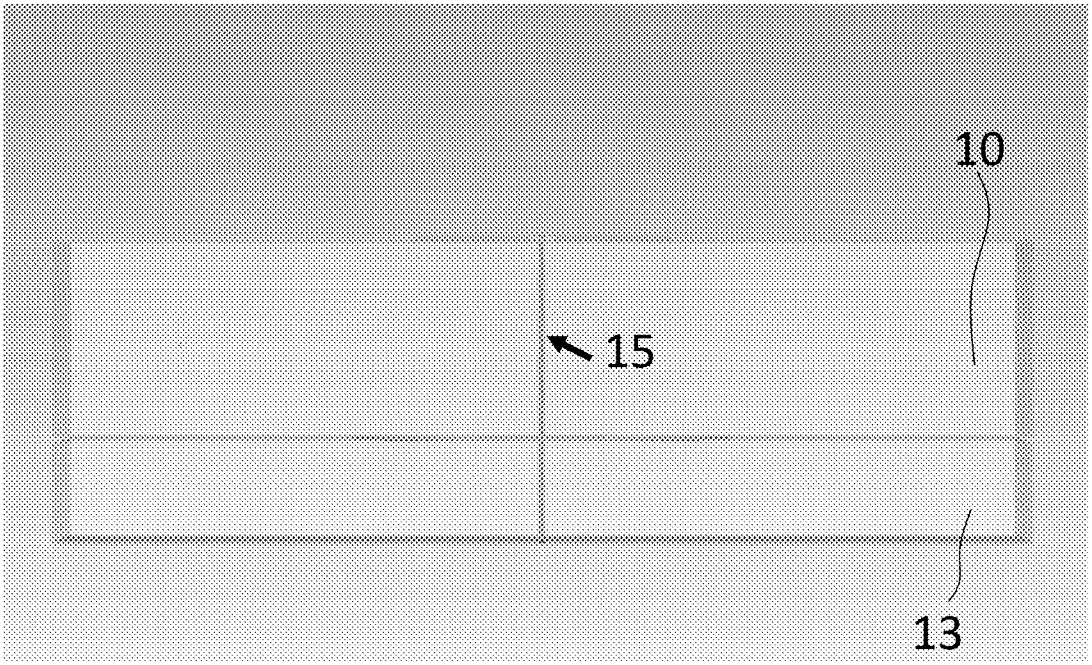
FIG. 5 illustrates a via passing through the broadband bipolar mmWave antenna of the present invention.

Reference is next made to FIGS. 3-5, where FIG. 3 illustrates a preferable size to the broadband bipolar mmWave antenna of the present invention, FIG. 4 illustrates the preferable size to the broadband bipolar mmWave antenna of the present invention from a different angle, and FIG. 5 illustrates a via passing through the broadband bipolar mmWave antenna of the present invention.

In FIG. 3, the broadband bipolar mmWave antenna of the present invention is designed to have the size of 10.19 mm×10.19 mm for its length and width. Such size is not meant to be limiting the scope of the present invention. It should be construed that people with ordinary skill in the art may refer to the disclosure of the present invention and make reasonable modification.

In FIG. 4, the first substrate 10 has a thickness of 1 mm, and the second substrate 13 has a thickness of 0.5 mm. The thicknesses of the two substrates are not meant to be limiting the scope of the present invention. It should be construed that people with ordinary skill in the art may refer to the disclosure of the present invention and make reasonable modification.

Referring to FIGS. 1A-1B, FIGS. 2-4, the first substrate 10 is a Rogers RO3003™ high frequency substrate, and the second substrate 13 is a FR-4 substrate. Rogers RO3003™ high frequency substrate and FR-4 substrate are commonly seen types of substrates, people with ordinary skill in the art may however refer to the disclosure of the present invention and make reasonable modification.

Figure 6:
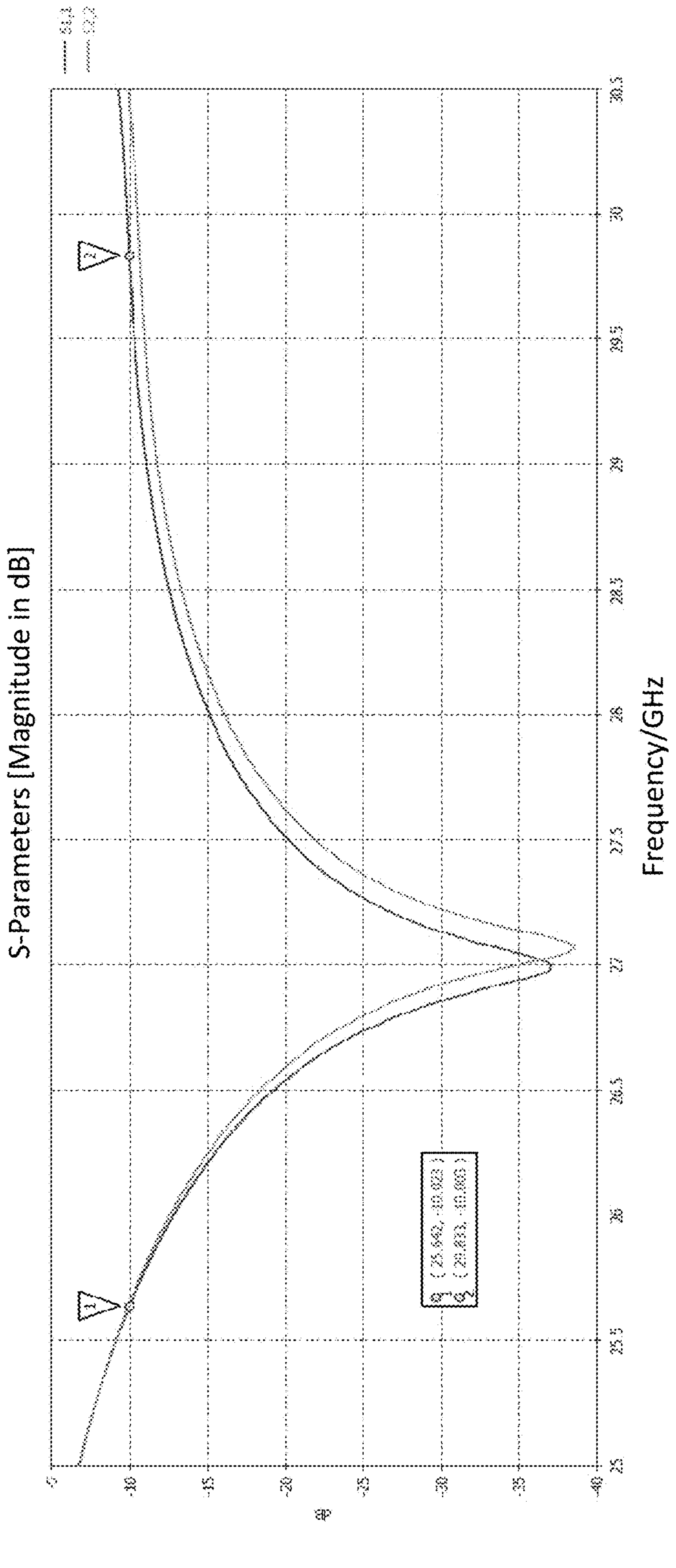
FIG. 6 illustrates the performance of the broadband bipolar mmWave antenna of the present invention.

Reference is next made to FIG. 6, which illustrates the performance of the broadband bipolar mmWave antenna of the present invention. As can be seen from FIG. 6, the antenna of the present invention may operate at a frequency band ranging from 25.6 GHz to 29.8 GHz.

From the return loss as shown in FIG. 6, mark 1 shows that the frequency is 25.6 GHz, and mark 2 shows that the frequency is 29.8 GHz. Both marks 1 and 2 are below −10 dB and further, the bandwidth is 4.2 GHz.

Figure 7:
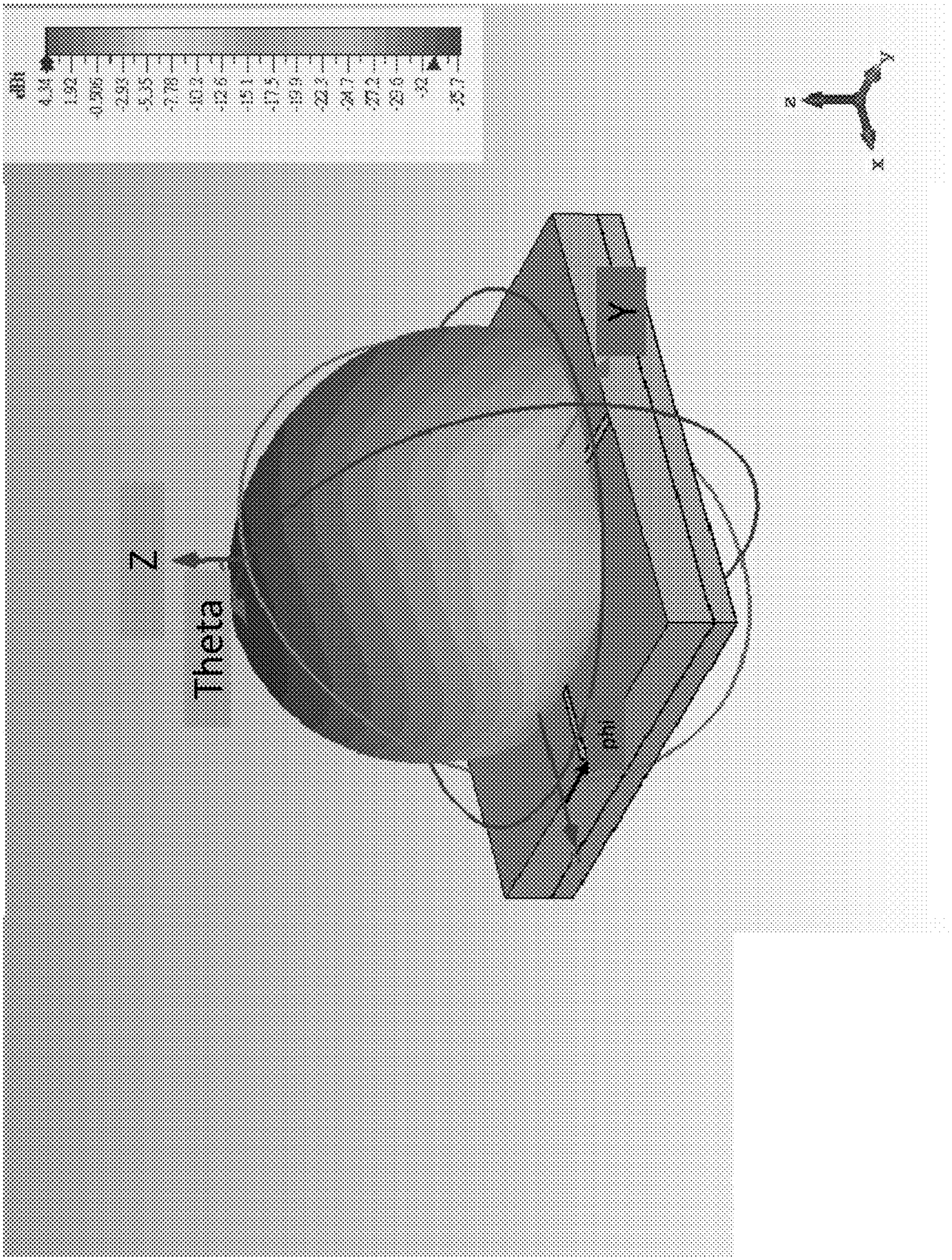
FIG. 7 illustrates a first radiation simulation chart of the broadband bipolar mmWave antenna of the present invention.
Figure 8:
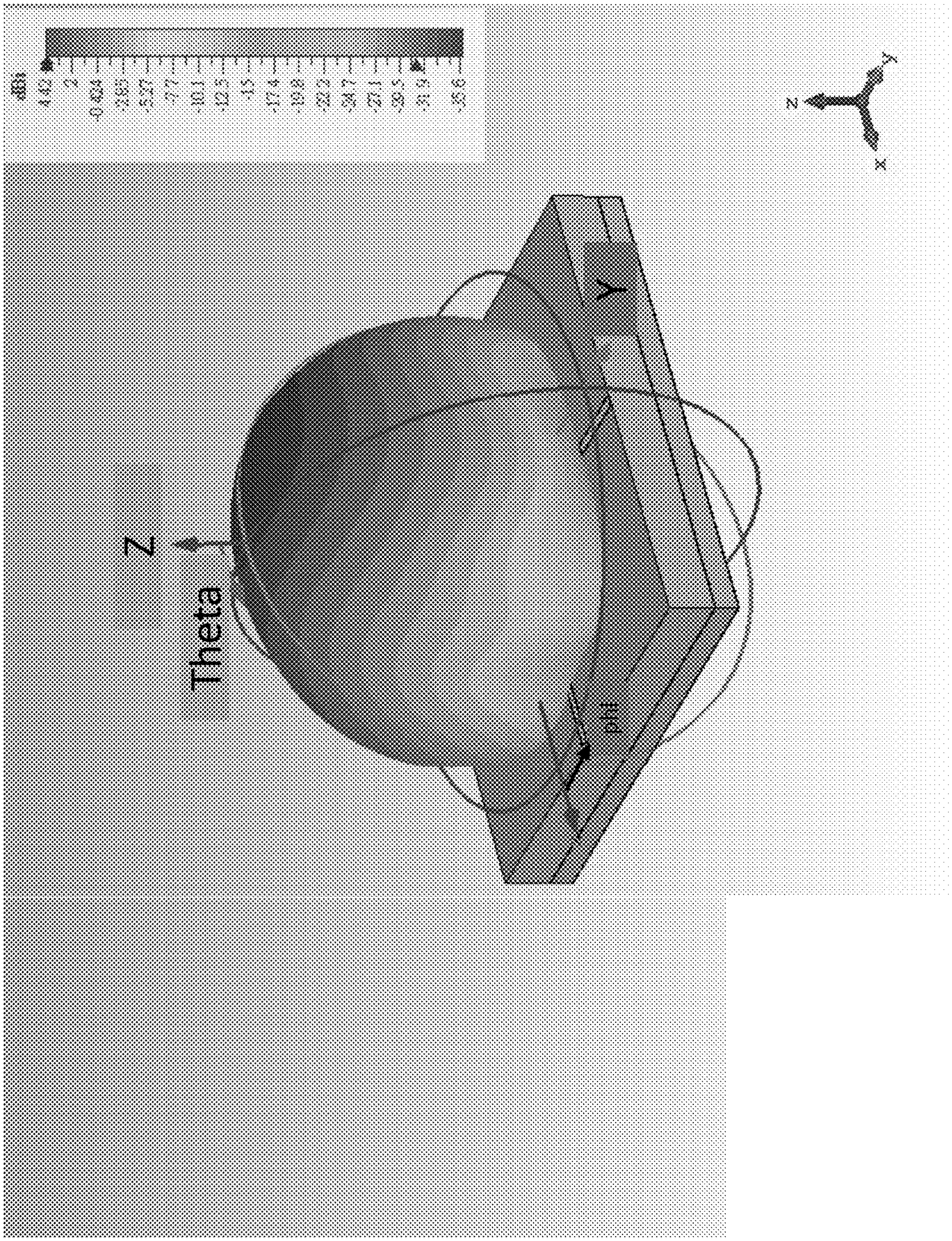
FIG. 8 illustrates a second radiation simulation chart of the broadband bipolar mmWave antenna of the present invention.
Figure 9:
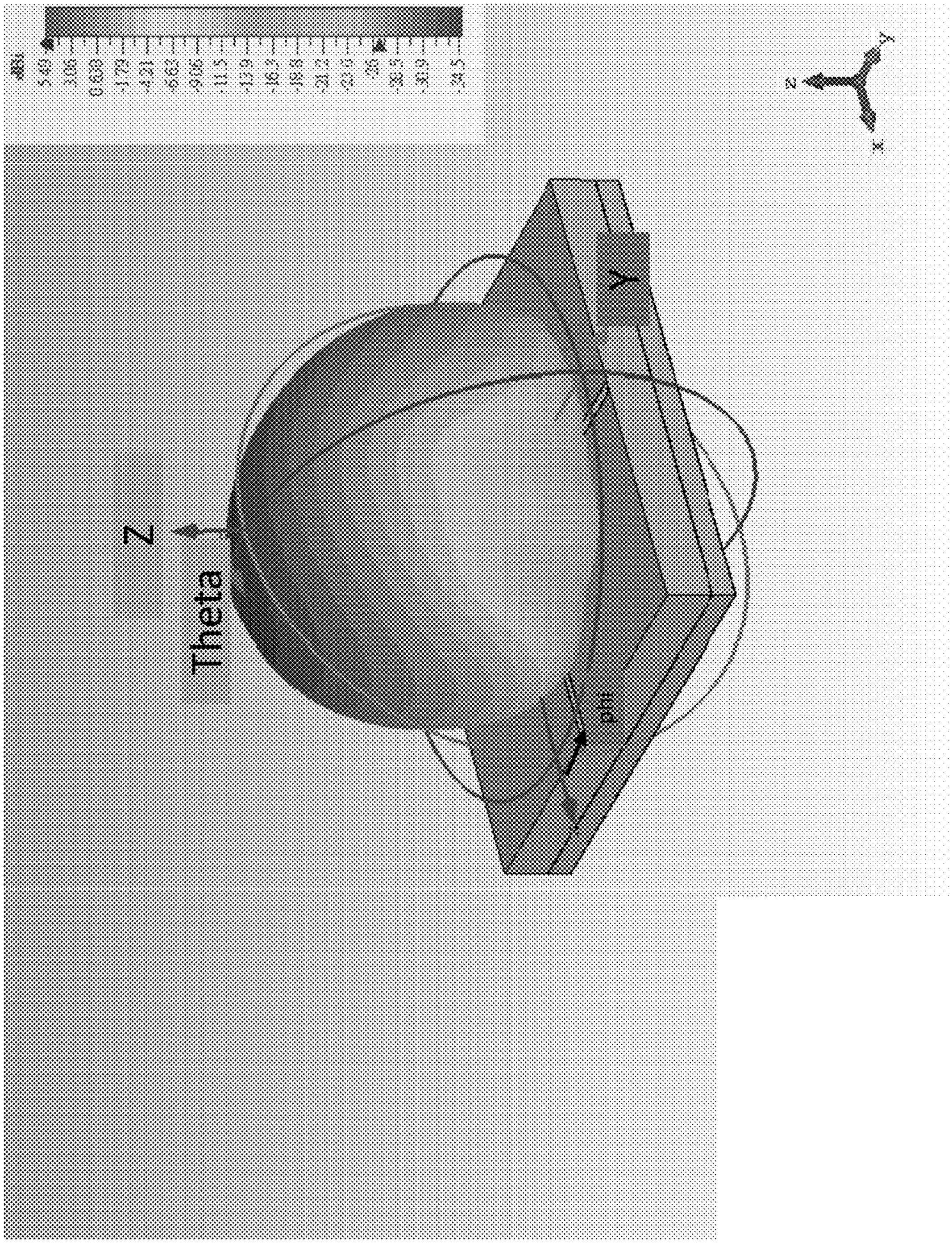
FIG. 9 illustrates a third radiation simulation chart of the broadband bipolar mmWave antenna of the present invention.
Figure 10:
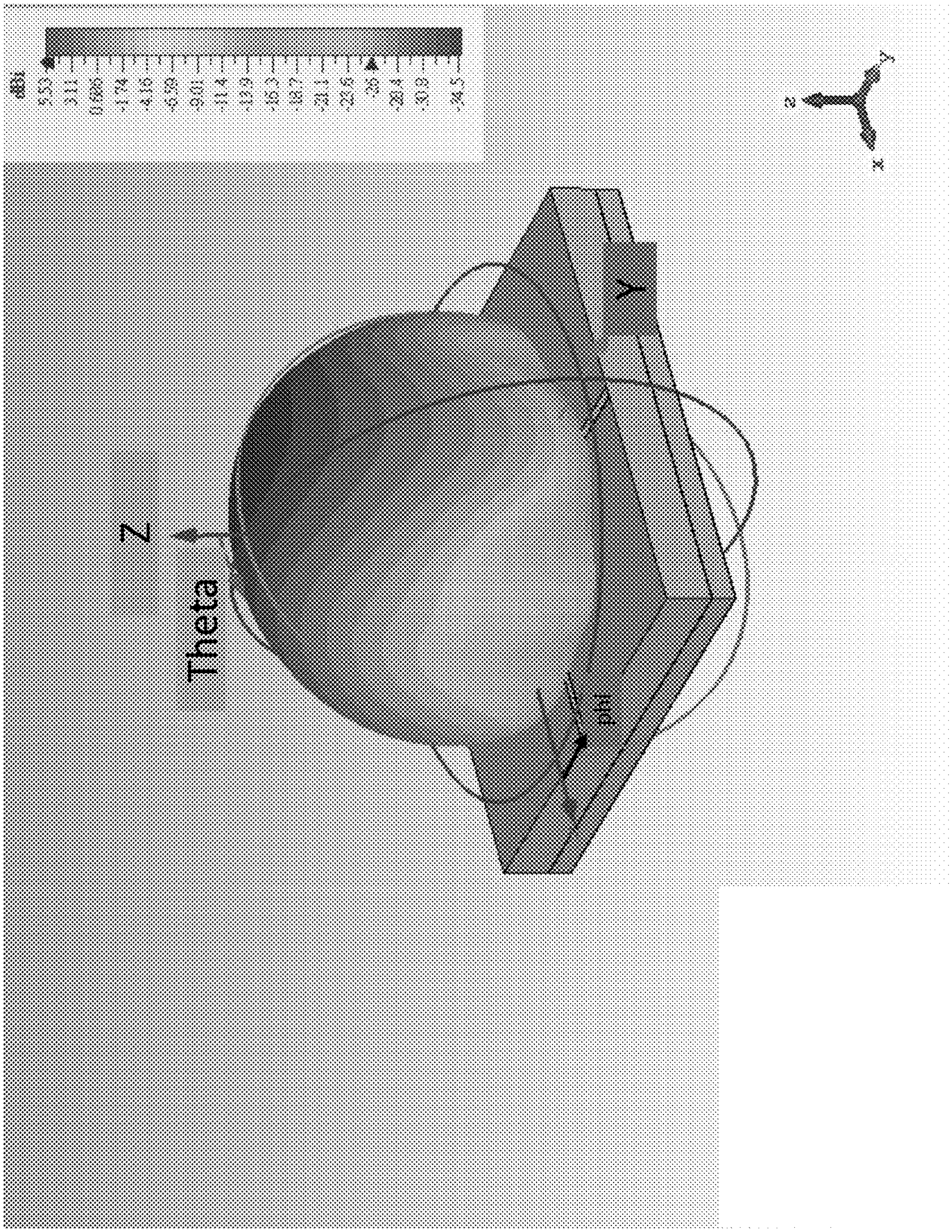
FIG. 10 illustrates a fourth radiation simulation chart of the broadband bipolar mmWave antenna of the present invention.
Figure 11:
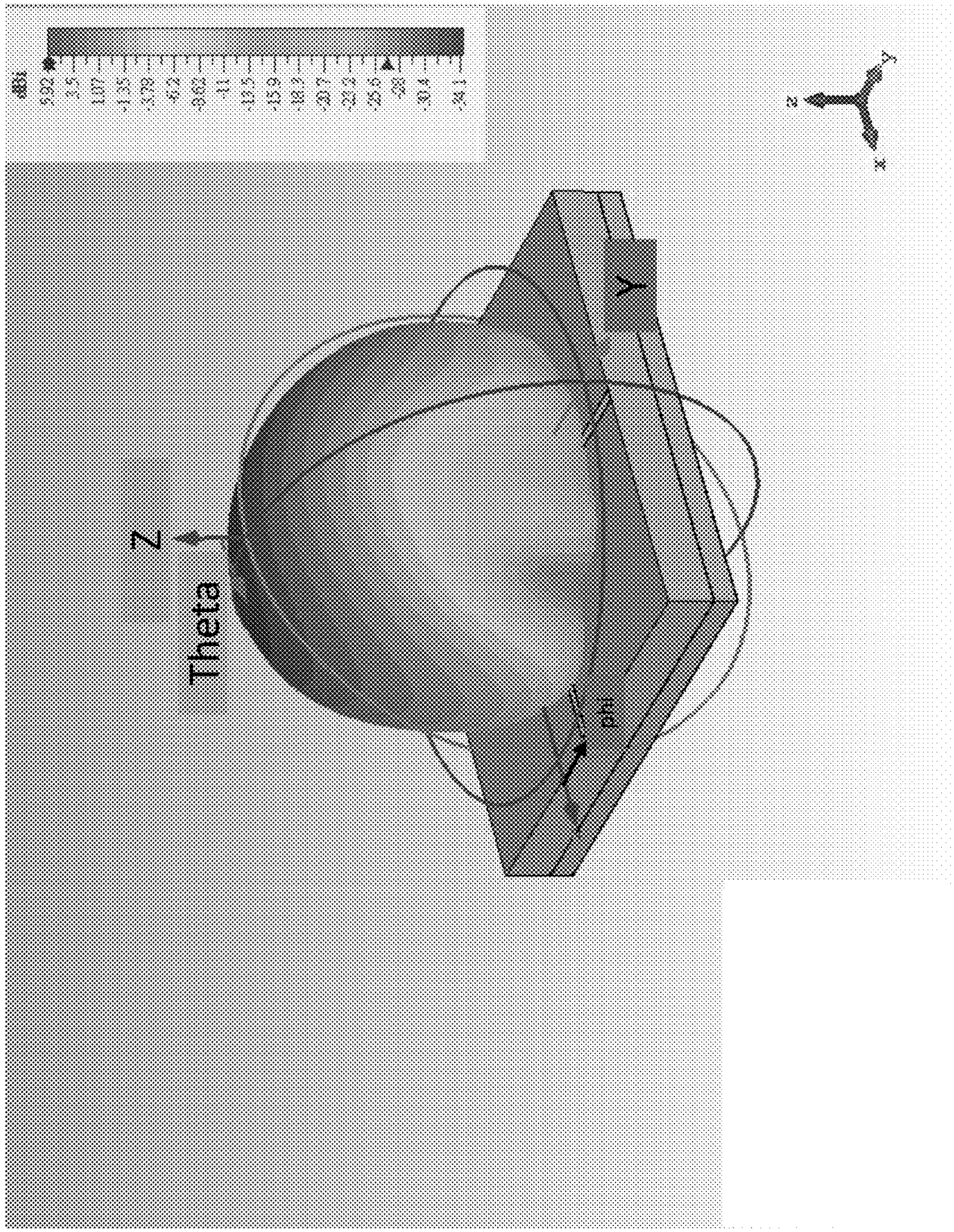
FIG. 11 illustrates a fifth radiation simulation chart of the broadband bipolar mmWave antenna of the present invention.
Figure 12:
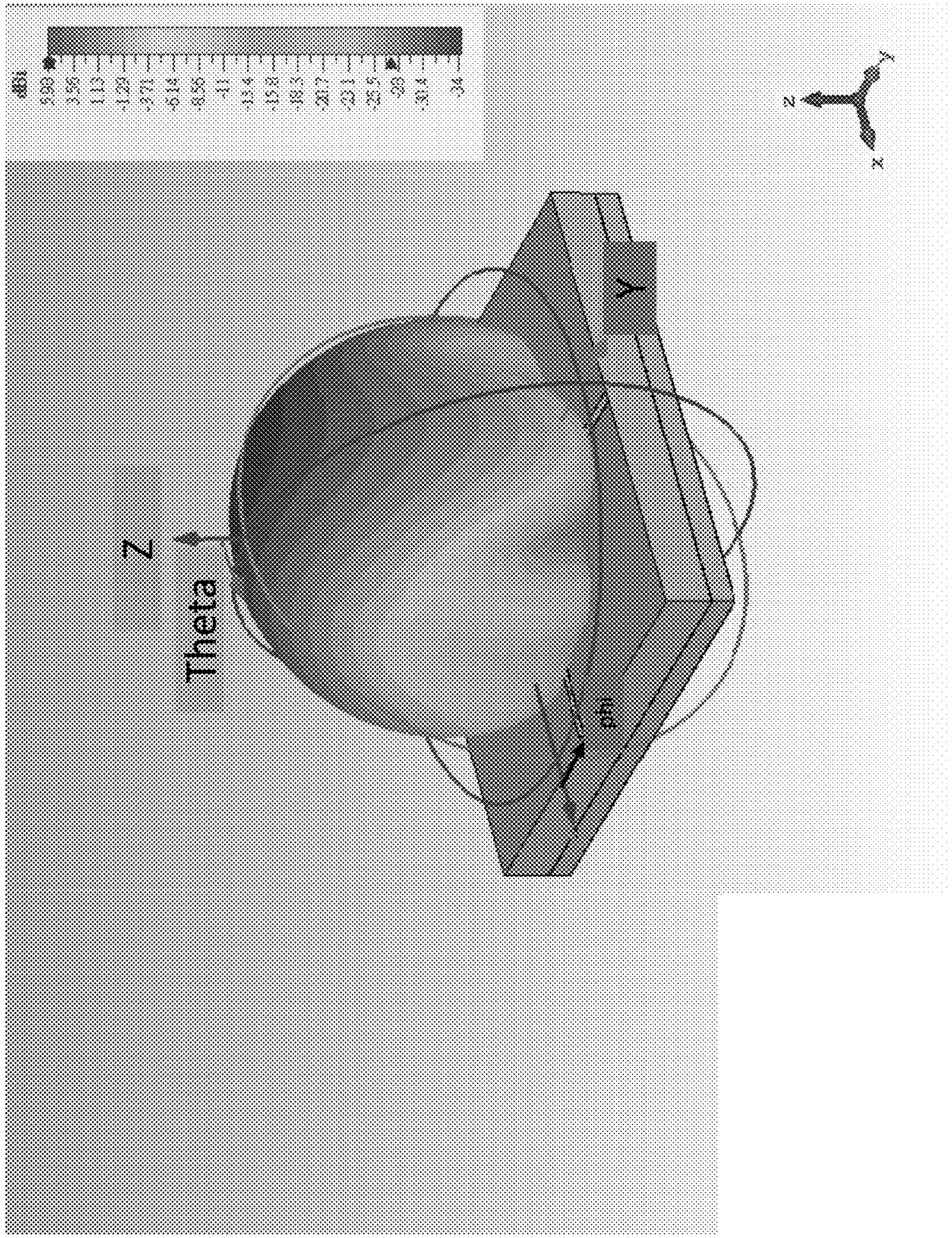
FIG. 12 illustrates a sixth radiation simulation chart of the broadband bipolar mmWave antenna of the present invention.
Figure 13:
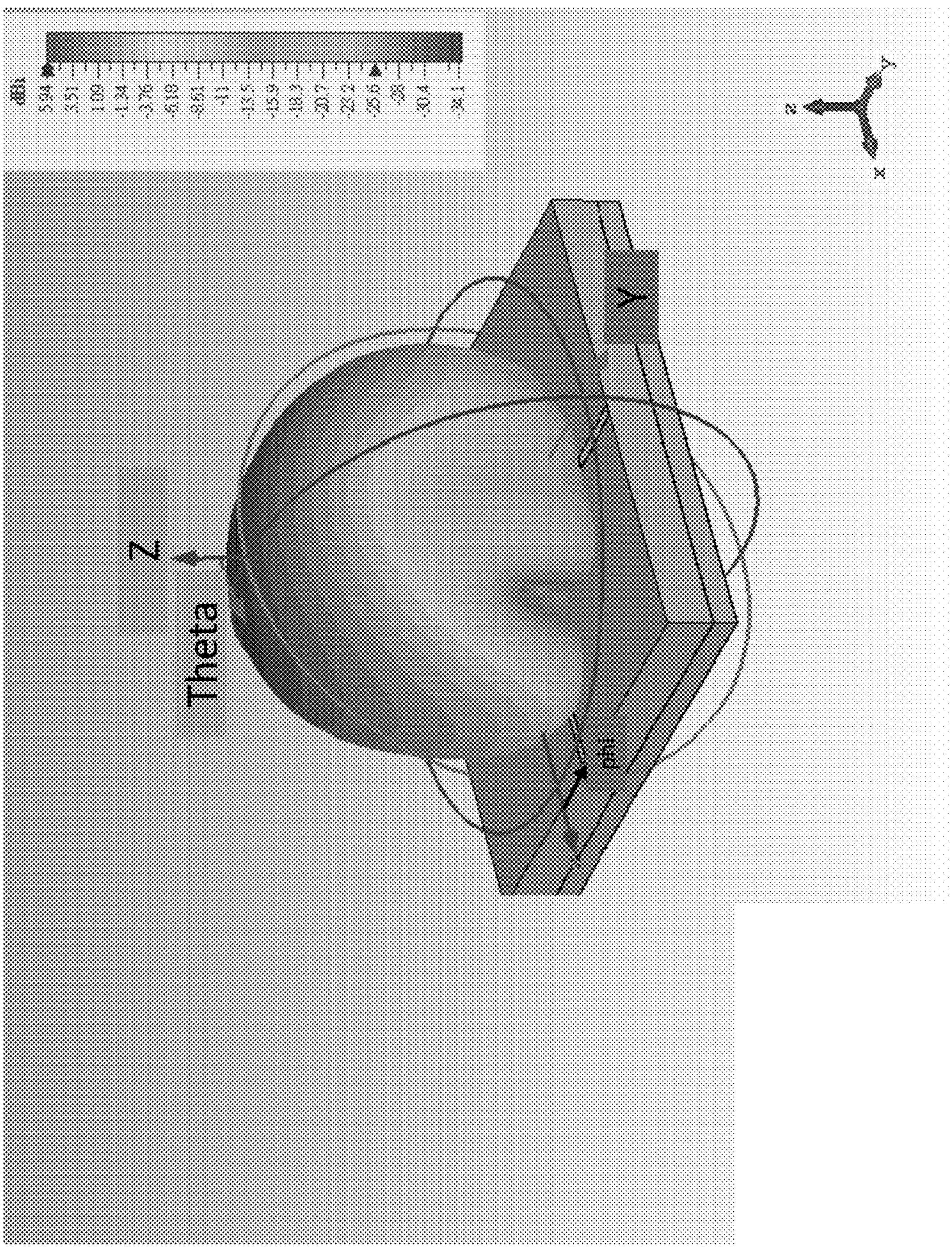
FIG. 13 illustrates a seventh radiation simulation chart of the broadband bipolar mmWave antenna of the present invention.
Figure 14:
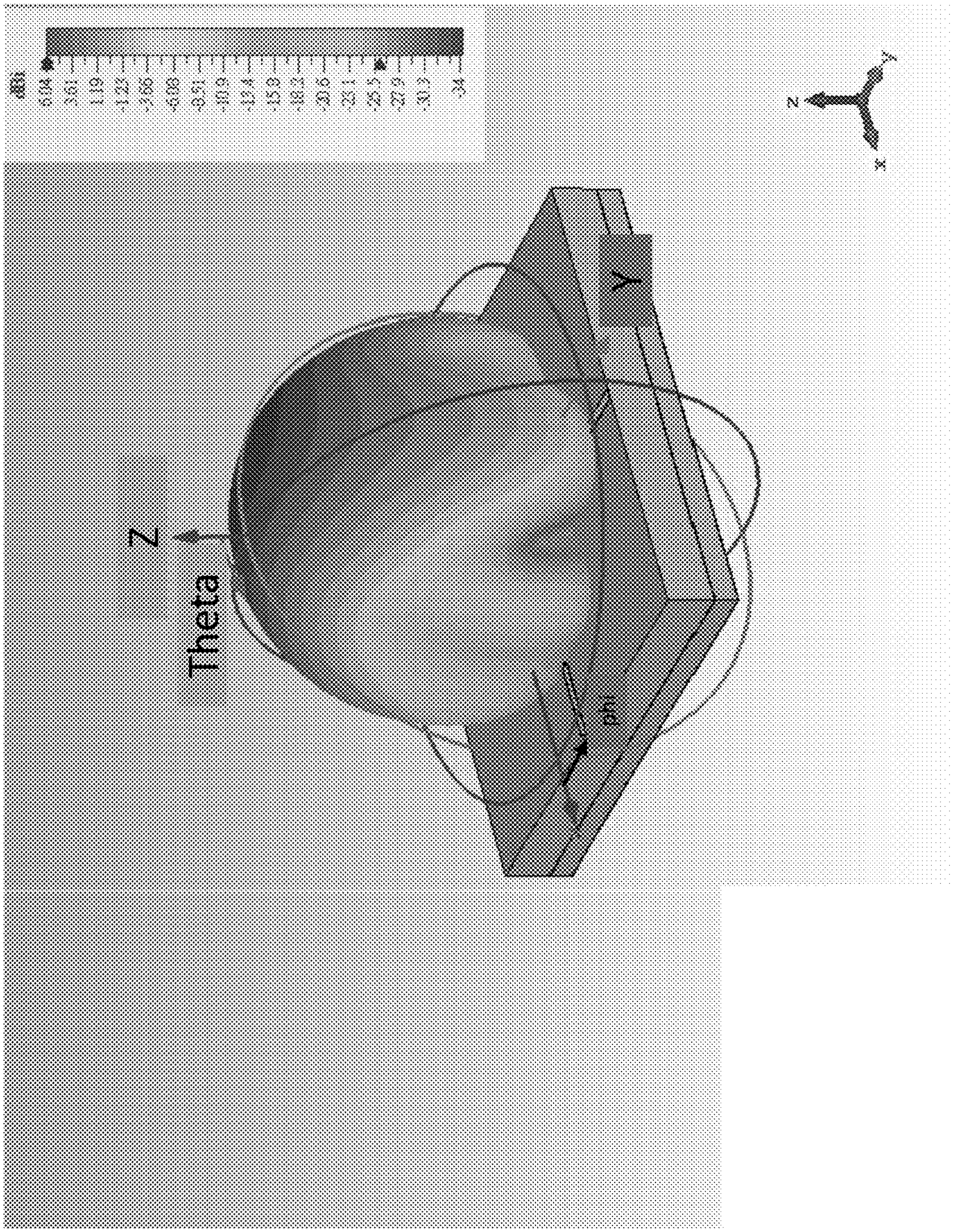
FIG. 14 illustrates a eighth radiation simulation chart of the broadband bipolar mmWave antenna of the present invention.
Figure 15:
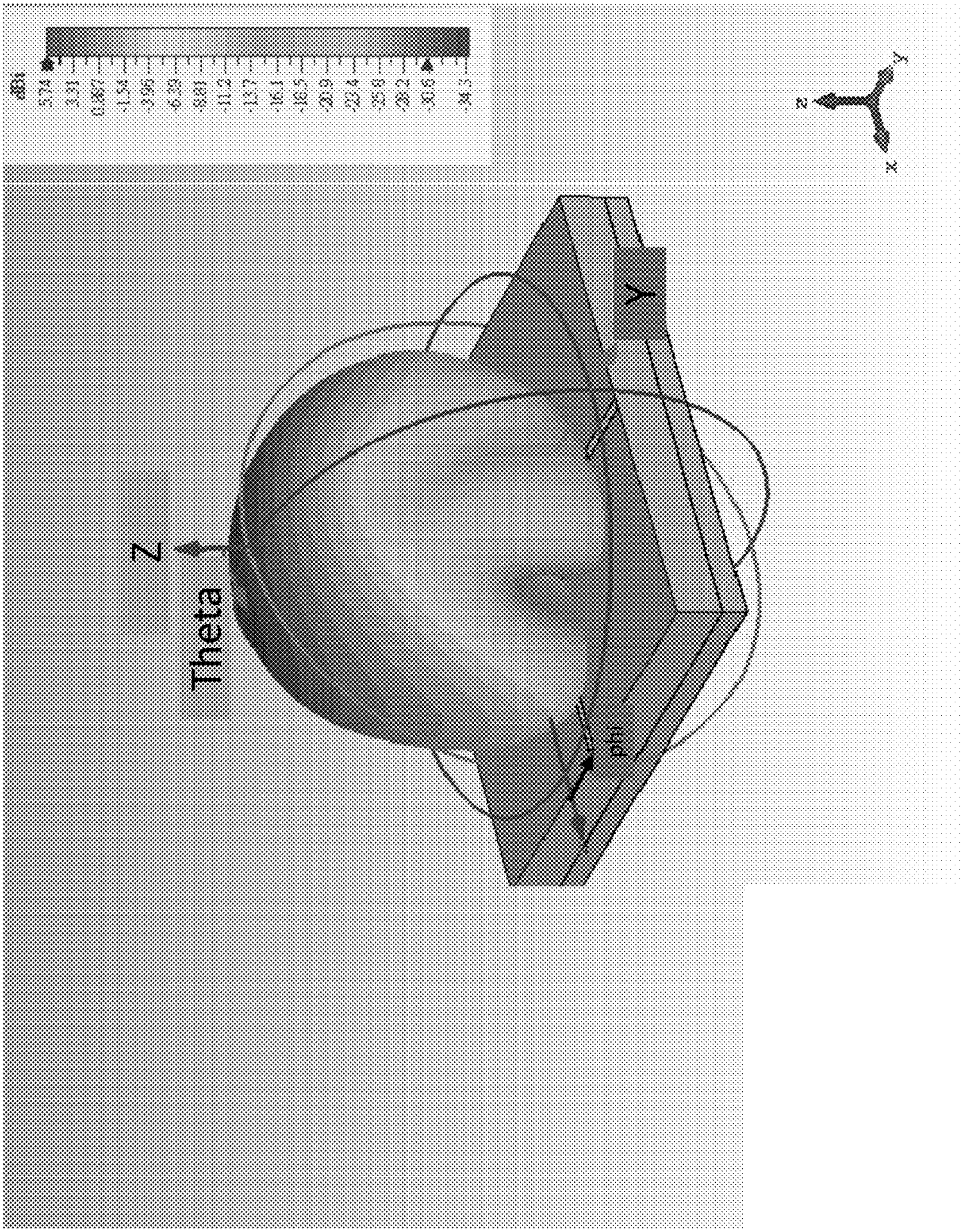
FIG. 15 illustrates a ninth radiation simulation chart of the broadband bipolar mmWave antenna of the present invention.
Figure 16:
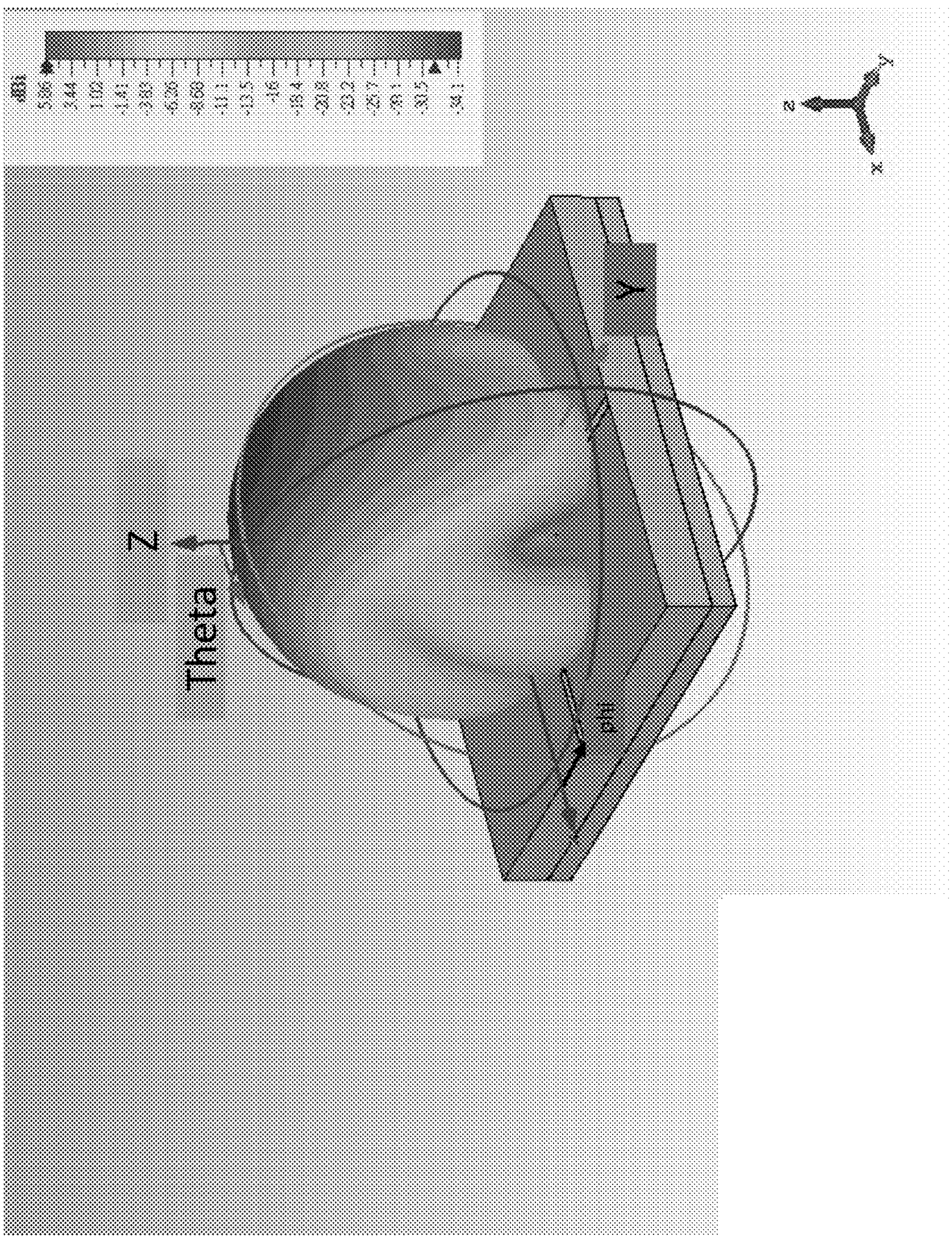
FIG. 16 illustrates a tenth radiation simulation chart of the broadband bipolar mmWave antenna of the present invention.

Reference is then collectively made to FIGS. 7-16, which depict the radiation simulation of the broadband bipolar mmWave antenna of the present invention. Wherein FIG. 7 illustrates a first radiation simulation chart of the broadband bipolar mmWave antenna of the present invention; FIG. 8 illustrates a second radiation simulation chart of the broadband bipolar mmWave antenna of the present invention; FIG. 9 illustrates a third radiation simulation chart of the broadband bipolar mmWave antenna of the present invention; FIG. 10 illustrates a fourth radiation simulation chart of the broadband bipolar mmWave antenna of the present invention; FIG. 11 illustrates a fifth radiation simulation chart of the broadband bipolar mmWave antenna of the present invention; FIG. 12 illustrates a sixth radiation simulation chart of the broadband bipolar mmWave antenna of the present invention; FIG. 13 illustrates a seventh radiation simulation chart of the broadband bipolar mmWave antenna of the present invention; FIG. 14 illustrates an eighth radiation simulation chart of the broadband bipolar mmWave antenna of the present invention; FIG. 15 illustrates a ninth radiation simulation chart of the broadband bipolar mmWave antenna of the present invention; and FIG. 16 illustrates a tenth radiation simulation chart of the broadband bipolar mmWave antenna of the present invention. From the radiation simulation drawings, one can understand that the radiation pattern as shown in FIGS. 7-16 exhibits the characteristic of a patch antenna, that the far field intensity is stronger than near field intensity. As such, the broadband bipolar mmWave antenna of the present invention delivers a more desirable functionality when applied on mobile devices, e.g., mobile phones.

FIG. 7 is the radiation pattern simulation result of port 1 at 25 GHz, and the antenna realized gain is 4.3 dBi. The simulation parameters associated with FIG. 7 are listed in Table 1 given below:

TABLE 1

| farfield (f = 25) [1] | |
|---|---|
| Output | Realized Gain |
| Frequency | 25 GHz |
| Rad. Effic. | −1.030 dB |
| Tot. Effic. | −2.164 dB |
| Rlzd. Gain | 4.343 dBi |

FIG. 8 is the radiation pattern simulation result of port 2 at 25 GHz, and the antenna realized gain is 4.4 dBi. The simulation parameters associated with FIG. 8 are listed in Table 2 given below:

TABLE 2

| farfield (f = 25) [2] | |
|---|---|
| Output | Realized Gain |
| Frequency | 25 GHz |
| Rad. Effic. | −0.9897 dB |
| Tot. Effic. | −2.113 dB |
| Rlzd. Gain | 4.425 dBi |

FIG. 9 is the radiation pattern simulation result of port 1 at 26 GHz, and the antenna realized gain is 5.4 dBi. The simulation parameters associated with FIG. 9 are listed in Table 3 given below:

TABLE 3

| farfield (f = 26) [1] | |
|---|---|
| Output | Realized Gain |
| Frequency | 26 GHz |
| Rad. Effic. | −1.130 dB |
| Tot. Effic. | −1.532 dB |
| Rlzd. Gain | 5.487 dBi |

FIG. 10 is the radiation pattern simulation result of port 2 at 26 GHz, and the antenna realized gain is 5.5 dBi. The simulation parameters associated with FIG. 10 are listed in Table 4 given below:

TABLE 4

| farfield (f = 26) [2] | |
|---|---|
| Output | Realized Gain |
| Frequency | 26 GHz |
| Rad. Effic. | −1.089 dB |
| Tot. Effic. | −1.506 dB |
| Rlzd. Gain | 5.535 dBi |

FIG. 11 is the radiation pattern simulation result of port 1 at 27 GHz, and the antenna realized gain is 5.9 dBi. The simulation parameters associated with FIG. 11 are listed in Table 5 given below:

TABLE 5

| farfield (f = 27) [1] | |
|---|---|
| Output | Realized Gain |
| Frequency | 27 GHz |
| Rad. Effic. | −1.287 dB |
| Tot. Effic. | −1.520 dB |
| Rlzd. Gain | 5.921 dBi |

FIG. 12 is the radiation pattern simulation result of port 2 at 27 GHz, and the antenna realized gain is 5.9 dBi. The simulation parameters associated with FIG. 12 are listed in Table 6 given below:

TABLE 6

| farfield (f = 27) [2] | |
|---|---|
| Output | Realized Gain |
| Frequency | 27 GHz |
| Rad. Effic. | −1.232 dB |
| Tot. Effic. | −1.466 dB |
| Rlzd. Gain | 5.983 dBi |

FIG. 13 is the radiation pattern simulation result of port 1 at 28 GHz, and the antenna realized gain is 5.9 dBi. The simulation parameters associated with FIG. 13 are listed in Table 7 given below:

TABLE 7

| farfield (f = 28) [1] | |
|---|---|
| Output | Realized Gain |
| Frequency | 28 GHz |
| Rad. Effic. | −1.422 dB |
| Tot. Effic. | −1.878 dB |
| Rlzd. Gain | 5.938 dBi |

FIG. 14 is the radiation pattern simulation result of port 2 at 28 GHz, and the antenna realized gain is 6.0 dBi. The simulation parameters associated with FIG. 14 are listed in Table 8 given below:

TABLE 8

| farfield (f = 28) [2] | |
|---|---|
| Output | Realized Gain |
| Frequency | 28 GHz |
| Rad. Effic. | −1.352 dB |
| Tot. Effic. | −1.777 dB |
| Rlzd. Gain | 6.039 dBi |

FIG. 15 is the radiation pattern simulation result of port 1 at 29 GHz, and the antenna realized gain is 5.7 dBi. The simulation parameters associated with FIG. 15 are listed in Table 9 given below:

TABLE 9

| farfield (f = 29) [1] | |
|---|---|
| Output | Realized Gain |
| Frequency | 29 GHz |
| Rad. Effic. | −1.670 dB |

TABLE 9-continued

| farfield (f = 29) [1] | |
|---|---|
| Output | Realized Gain |
| Tot. Effic. | −2.427 dB |
| Rlzd. Gain | 5.736 dBi |

FIG. 16 is the radiation pattern simulation result of port 2 at 29 GHz, and the antenna realized gain is 5.8 dBi. The simulation parameters associated with FIG. 16 are listed in Table 10 given below:

TABLE 10

| farfield (f = 29) [2] | |
|---|---|
| Output | Realized Gain |
| Frequency | 29 GHz |
| Rad. Effic. | −1.588 dB |
| Tot. Effic. | −2.285 dB |
| Rlzd. Gain | 5.846 dBi |

In sum, the present invention provides an antenna with simple structure, while the antenna performance is comparable to or even better than that of conventional antenna structure (the bandwidth of the antenna structure of the present invention is comparable to or even better than that of conventional antenna structure). Further, the manufacturing cost for the antenna structure as provided in the present invention may be effectively reduced.

In sum, the design of conventional patch antennas uses multi-layer substrates for lamination as well as the use of slot technology and many vias. These conventional structures increase the difficulty of production and therefore drive up the manufacturing cost. Further, referring to the return loss of each of the conventional structures, the bandwidths of the antenna of the present invention exhibit better performance than that of the conventional patch antennas, that the bandwidth of the present invention is wider than that of the conventional patch antenna.

In sum, the present invention provides a simple antenna structure, which may reduce the complexity of manufacturing thereof, while the antenna maintains the radiation performance.

The invention claimed is:

1. A broadband bipolar mmWave antenna, comprising:
- a first substrate having an upper surface and a bottom surface;
- a second substrate attached to the bottom surface of the first substrate;
- a parasitic element disposed in between the first and second substrates;
- a ground substrate attached to the second substrate;
- a patch formed on the upper surface of the first substrate;
- a first feeding line coupled with the patch and formed on the upper surface of the first substrate;
- a second feeding line coupled with the patch and formed on the upper surface of the first substrate; and
- a via formed passing through the first substrate, the parasitic element, the second substrate, and the ground substrate, wherein the ground substrate is a FR-4 substrate.

2. The broadband bipolar mmWave antenna according to claim 1, wherein the antenna operates at a frequency band ranging from 25.6 GHz to 29.8 GHz.

3. The broadband bipolar mmWave antenna according to claim 1, wherein the first substrate is a Rogers RO3003™ high frequency substrate.

4. The broadband bipolar mmWave antenna according to claim 1, wherein the second substrate is a FR-4 substrate.

5. The broadband bipolar mmWave antenna according to claim 1, wherein the broadband bipolar mm Wave antenna has a size of 10.19 mm×10.19 mm.

6. The broadband bipolar mmWave antenna according to claim 1, wherein the first substrate has a thickness of 1 mm.

7. The broadband bipolar mmWave antenna according to claim 1, wherein the second substrate has a thickness of 0.5 mm.

* * * * *